United States Patent [19]
Fecko et al.

[11] Patent Number: 5,916,093
[45] Date of Patent: Jun. 29, 1999

[54] COMPOSITE FIBERGLASS RAILCAR ROOF

[75] Inventors: Joseph V. Fecko, Danville; Paul L. Packer, Wheatland, both of Calif.

[73] Assignee: American Composite Material Engineering, Inc., Marysville, Calif.

[21] Appl. No.: 08/736,255

[22] Filed: Oct. 24, 1996

[51] Int. Cl.⁶ .......................... B61D 17/00; B61D 17/12; F25D 3/12

[52] U.S. Cl. .......................... 52/17; 52/45; 52/46; 52/51; 52/53; 52/309.9; 52/630; 62/239; 62/384

[58] Field of Search .............................. 62/384, 385, 388, 62/239; 52/17, 45, 46, 48, 49, 50, 51, 52, 53, 56, 630, 309.9; 296/210, 215; 156/253

[56] References Cited

U.S. PATENT DOCUMENTS

| | | | |
|---|---|---|---|
| 2,034,081 | 3/1936 | Bonsall | 52/46 |
| 2,513,829 | 7/1950 | Vaughn | 52/56 |
| 2,529,641 | 11/1950 | Torburn | 52/17 |
| 2,536,241 | 1/1951 | Williamson et al. | 62/384 X |
| 2,966,436 | 12/1960 | Fox et al. | 156/253 X |
| 3,029,172 | 4/1962 | Glass | 52/17 X |
| 3,059,734 | 10/1962 | Tripp . | |
| 3,429,083 | 2/1969 | Voros . | |
| 3,823,518 | 7/1974 | Allen . | |
| 4,020,603 | 5/1977 | Austill | 52/53 |
| 4,369,608 | 1/1983 | Miura et al. | 52/309.9 |
| 4,498,306 | 2/1985 | Tyree, Jr. | 62/384 X |
| 4,575,148 | 3/1986 | Bieber | 296/210 |
| 4,593,536 | 6/1986 | Fink et al. . | |
| 4,599,257 | 7/1986 | Nutt | 156/253 X |
| 4,608,931 | 9/1986 | Ruhmann et al. | 105/248 |
| 4,811,540 | 3/1989 | Kallies et al. | 52/630 |
| 4,891,954 | 1/1990 | Thomsen . | |
| 4,951,479 | 8/1990 | Araquistain et al. . | |
| 5,029,936 | 7/1991 | Gonzalez | 296/210 |
| 5,066,067 | 11/1991 | Ferdows | 296/210 X |
| 5,168,717 | 12/1992 | Mowatt-Larssen | 62/239 |
| 5,392,717 | 2/1995 | Hesch et al. . | |
| 5,397,201 | 3/1995 | Novak et al. | 52/309.9 X |
| 5,415,009 | 5/1995 | Weiner | 62/239 |
| 5,460,013 | 10/1995 | Thomsen . | |
| 5,513,595 | 5/1996 | Chatterton | 296/24.2 X |
| 5,555,733 | 9/1996 | Claterbos et al. | 62/384 X |
| 5,584,188 | 12/1996 | Tippmann et al. | 62/239 |

*Primary Examiner*—Carl D. Friedman
*Assistant Examiner*—Laura A. Callo
*Attorney, Agent, or Firm*—Kolisch, Hartwell, Dickinson, McCormack & Heuser

[57] ABSTRACT

A fiberglass railcar roof that includes a fiberglass surface with a central portion and plural elongate fiberglass ribs extending transverse to the longitudinal axis of the fiberglass surface. In a first embodiment, the central portion has a cross-sectional configuration that defines a first arc, and the ribs each have broad widths and each extend above the central portion to define a second arc that intersects the first arc. In a second embodiment, the ribs have arcuate cross-sections and extend downward from the lower face of the central portion. Also disclosed are embodiments of the previously described roofs that are configured for use on refrigerated and cryogenic railcars.

21 Claims, 7 Drawing Sheets

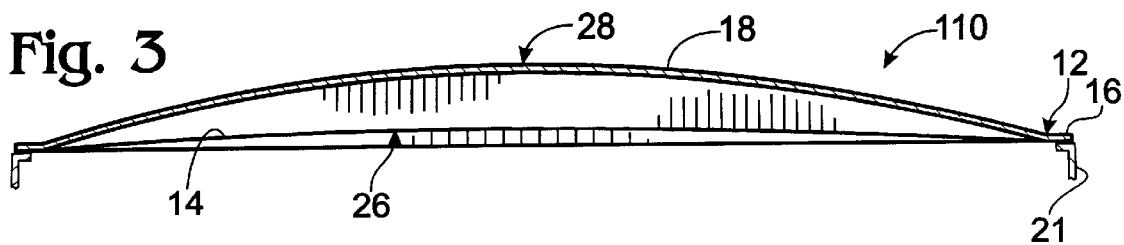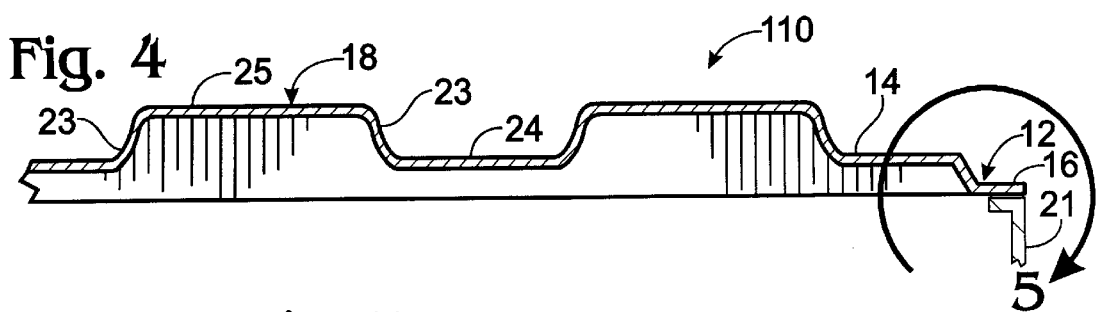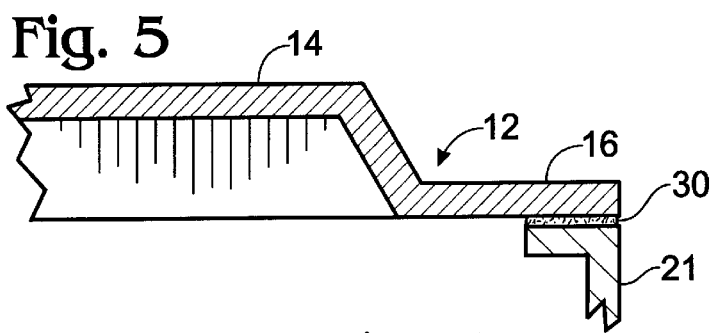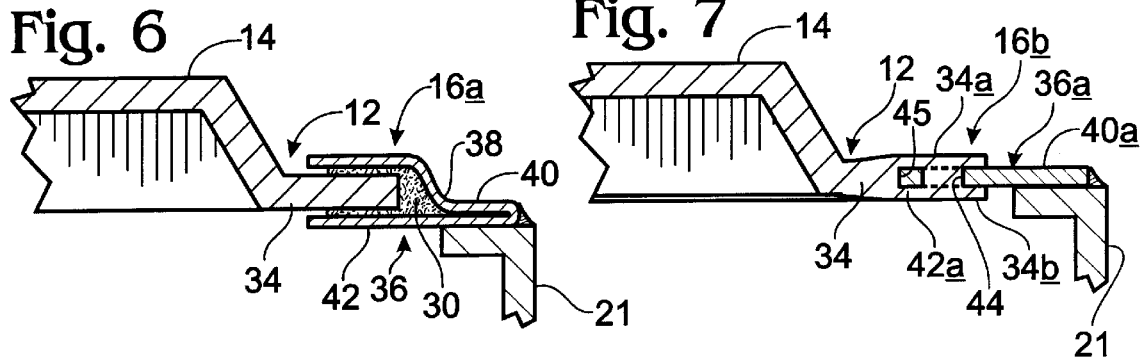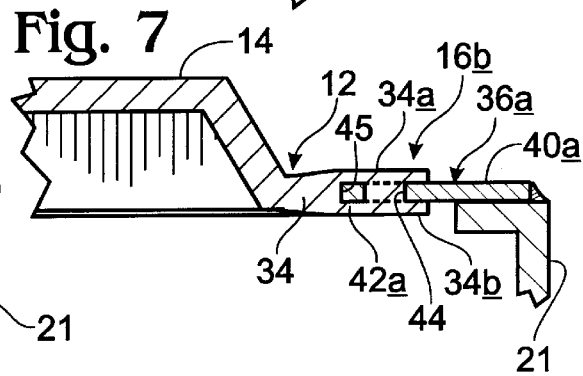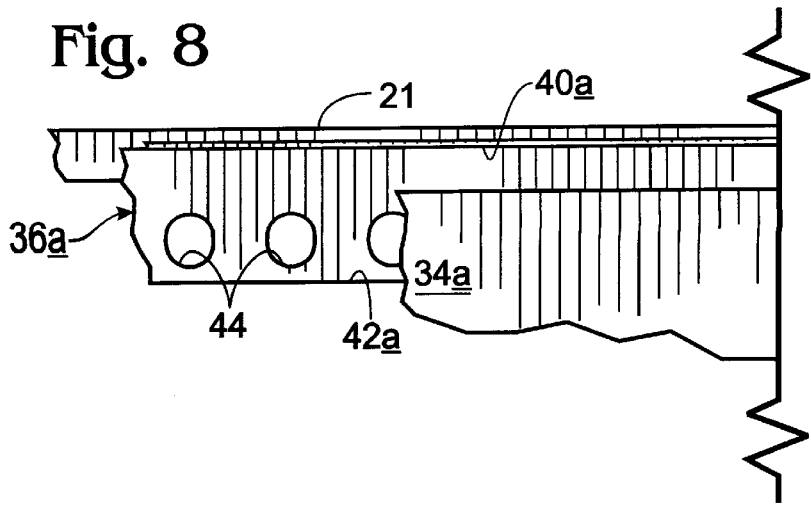

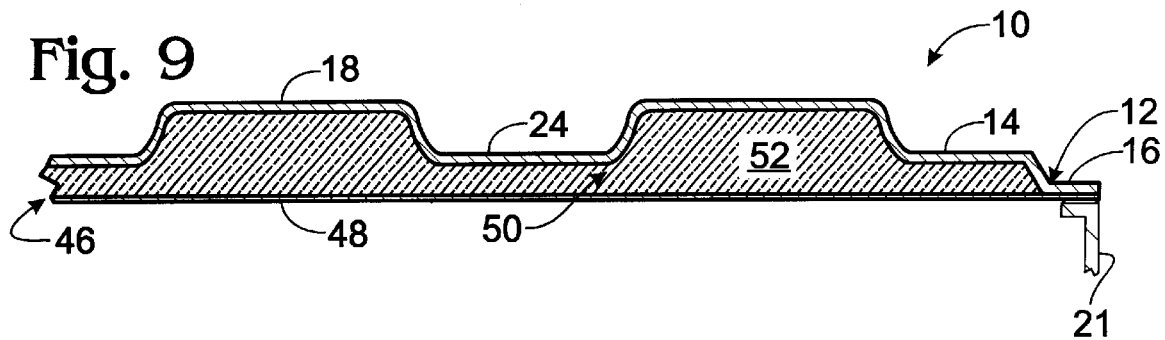
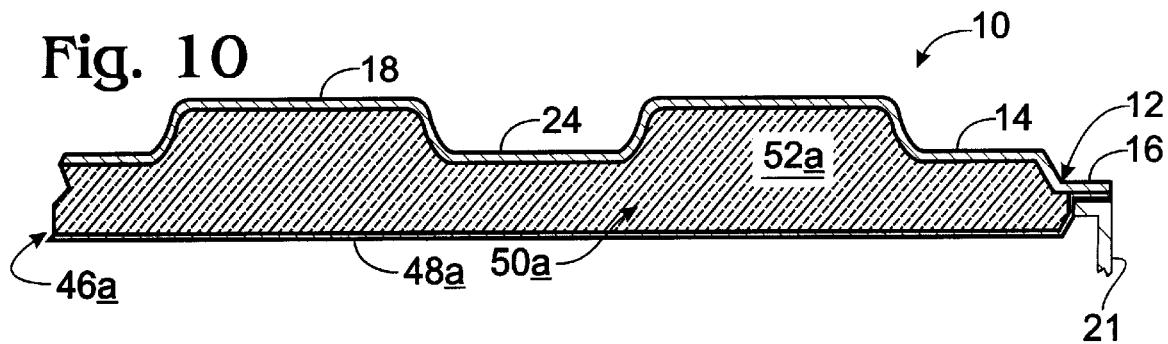

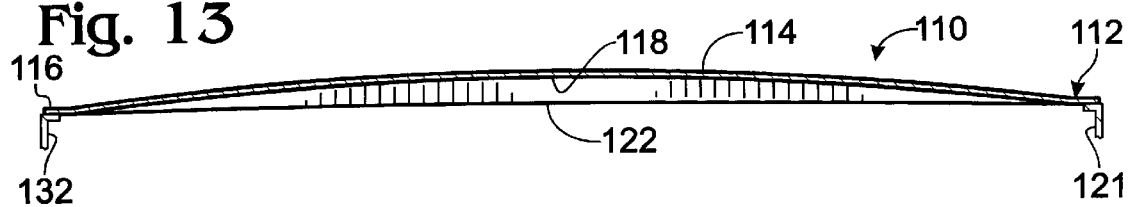
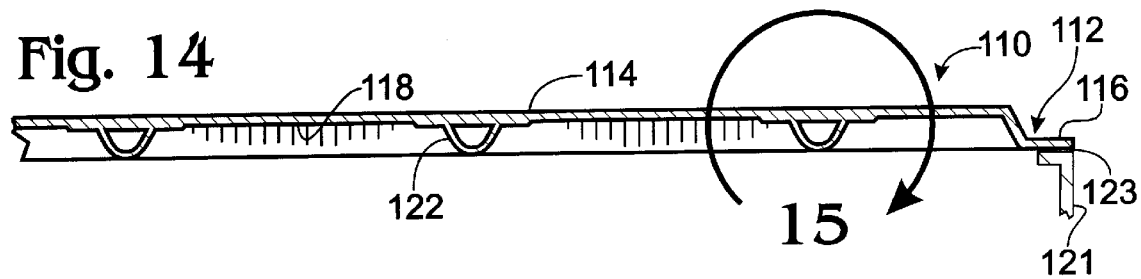
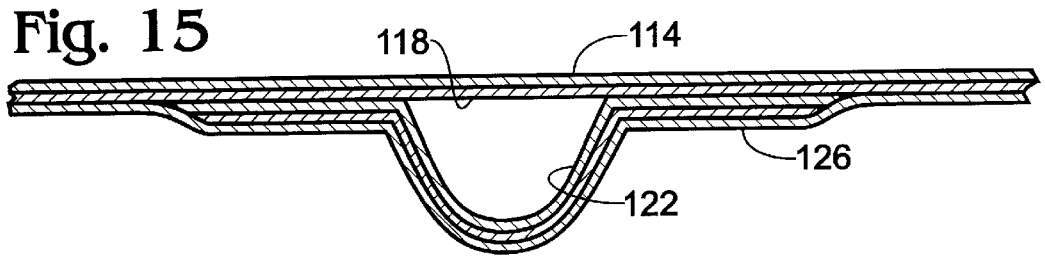
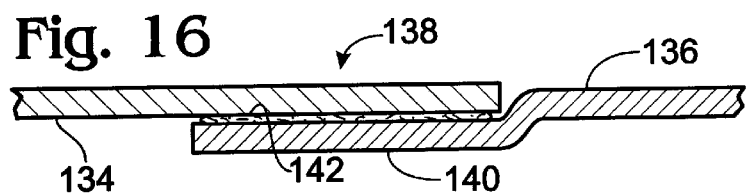
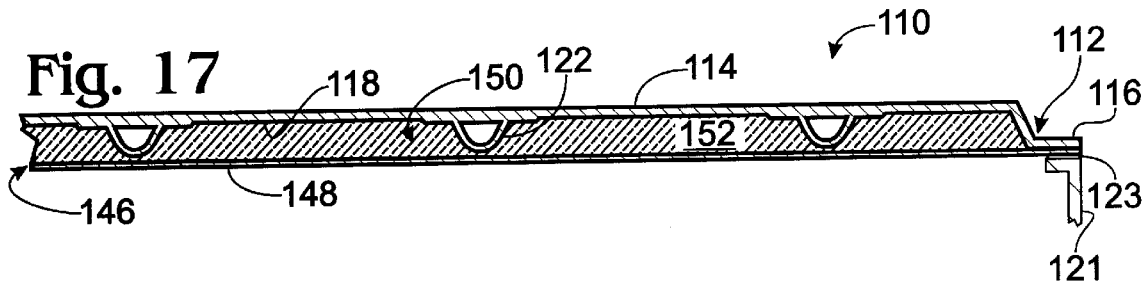
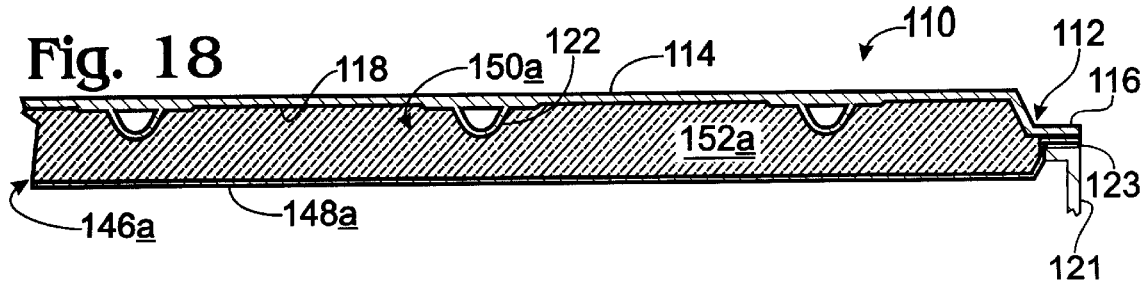

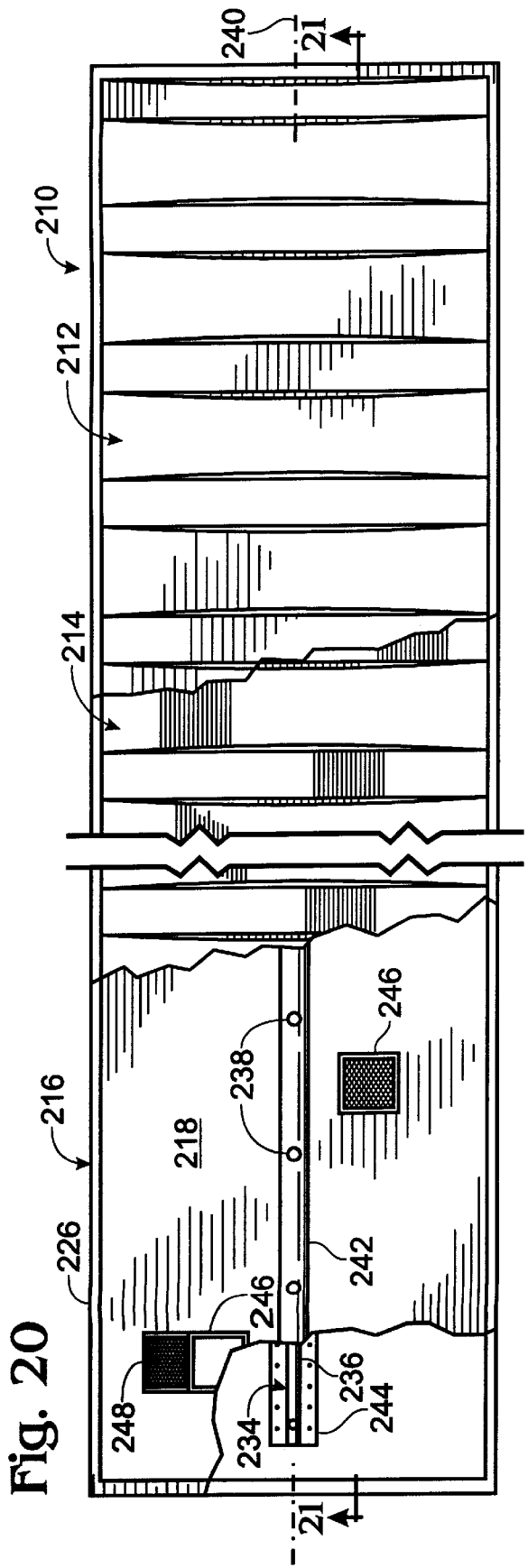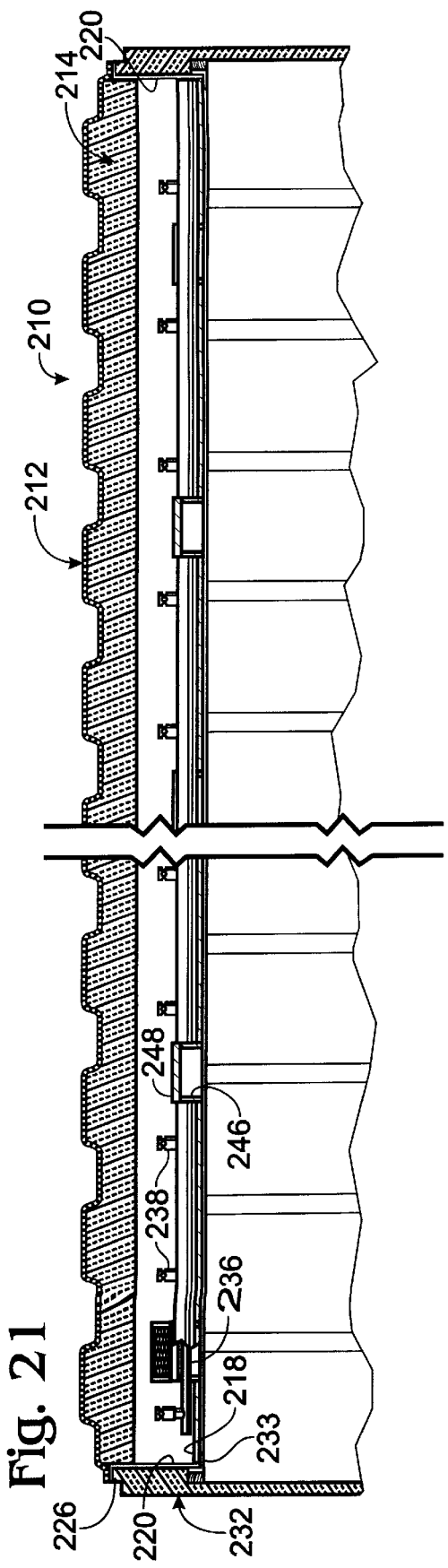

COMPOSITE FIBERGLASS RAILCAR ROOF

BACKGROUND AND SUMMARY OF THE INVENTION

The present invention relates to a roof for a railcar, and more particularly to a composite fiberglass roof for use on standard, high cube, refrigerated and cryogenic railcars.

Today, the four most common types of railcars being used commercially for the transportation of cargo are standard, high cube, refrigerated and cryogenic railcars. A standard railcar, which is approximately 51 feet long, has a storage compartment that is approximately 9 feet high and 9 feet wide, with a storage area of over 4,000 ft$^3$. High cube railcars are similar in construction, except they are approximately 17 feet longer and 4½ feet higher than standard railcars. This added size provides a storage area of over 8,200 ft$^3$, but also includes a height that requires a shallow roof that only extends above the railcar by a few inches. The exteriors of refrigerated and cryogenic railcars closely resemble standard or high cube railcars, but their interiors are insulated. A refrigerated railcar also contains a mechanical refrigeration system, while a clyogenic railcar includes a false ceiling above which a load of cryogenic material is stored to provide the necessary cooling of the railcar and its cargo.

Each of these railcars has a roof, which is formed of galvanized steel and includes numerous individual panels that extend transverse to the railcar and are riveted, welded or otherwise bolted to each other and to the railcar's sidewalls. Steel roofs have been the industry standard for years, yet they have many disadvantages, as discussed below.

Conventional steel roofs are difficult to install on a railcar. Typically, the roof is formed from numerous individual panels that each have a 3 foot length and a width that is sized to span the distance between the railcar's sidewalls. Furthermore, each panel has an upwardly extending flange extending along both of the panel's lateral edges. Two panels are joined by placing their lateral edges next to each other and welding or riveting the flanges together. The joined flanges form a rib-like support between the panels, which must be subsequently sealed to prevent it from leaking. The roof is formed by repeating this process until enough panels have been interconnected to cover the upper surface of a railcar. This entire structure is next placed on top of a railcar, where it is welded to the railcar. The seam formed between the roof and the railcar must also be sealed. Furthermore, because the installation process can loosen or damage the seals between the individual panels, the roof must be tested to ensure it does not leak after it is installed on the railcar. Typically, the entire installation process is time-consuming and tedious, taking at least 20 man-hours to complete.

The disadvantages of using a conventional steel roof do not end once the roof is installed. An additional problem with steel roofs is that steel is expensive and extremely heavy. A conventional steel roof typically weighs more than 2,000 pounds. When mounted on a railcar, this weight raises the center of gravity of the railcar by approximately 4 or 5 inches. As a result, the railcar is less balanced and more prone to tipping. This added weight also increases the power and fuel necessary to transport the railcar, as well as the time necessary to stop the railcar.

Additional problems with steel roofs arise during their use on a railcar. As discussed, the steel roof panels typically are joined to each other and the railcar through a combination of rivets, bolts and welds, which must be sealed to prevent leakage. Even if the roof is completely sealed when first installed, the extreme vibration and torsion that the railcar and roof undergo during normal use can cause these seals, bolts and/or rivets to loosen and leak. When this occurs, water and other materials can pass through the roof, thereby exposing the railcar's cargo to possible contamination and damage.

A further disadvantage can occur when cargo is loaded into or removed from a railcar with a steel roof. During this process, the railcar's roof can be struck by cargo being loaded or removed, or struck by the mast of a forklift, which is commonly used to load and unload the railcar. Impact from this contact can deform the roof upward. Because the steel roof is inelastic, it does not return to its original position after the impact, but remains permanently deformed. In addition, when the roof is pushed or deformed upward, it may cause the sides of the railcar to collapse inward, thereby distorting the entire railcar. The entire railcar must then be removed from service for repair. Furthermore, contact to the roof of the railcar can also cause the roof to tear or puncture. A tear or puncture is difficult to patch because the roof is formed of galvanized steel. Therefore it is often necessary to remove and replace any punctured or torn roof panels.

Still another problem with conventional steel roofs is that they readily absorb heat from outside the railcar and do not allow light to enter the railcar. When the railcar is used on warm days, the steel construction of the roof quickly heats up and conducts this heat to the railcar's interior. On hot days, it is possible for the interior of a railcar to reach temperatures in excess of 100° F. Furthermore, because no light passes through the roof, external light sources must be brought into the railcar whenever the it is to be loaded or unloaded. Installing external light sources not only increases the time to load or unload the railcar, but also increases the number of obstacles that must be avoided by workers when loading or unloading the railcar.

When a conventional steel roof is mounted on a refrigerated or cryogenic railcar, an insulating layer must be added beneath an existing steel roof. Installing this layer requires retrofitting a liner beneath the railcar's steel roof. Next, the entire roof assembly must be rigidly braced from beneath the newly installed liner. Finally, holes are drilled through the liner, and insulating material is injected though these holes. Unless the bracing and liner are very thoroughly and carefully installed, the pressure exerted by the injected insulating material is likely to cause the entire subassembly to collapse inward, thereby requiring the railcar to be cleaned and the installation process to be repeated.

In addition to this installation process, cryogenic railcars further require a false ceiling and a cryogenic supply system to be installed beneath this insulating layer. Conventional supply systems are mounted to the steel roof above the false ceiling. The ceiling typically includes individual sections that extend across the width of the railcar and are placed end-to-end beneath the supply system. If it is necessary to repair or otherwise maintain the supply system, these sections must each be removed to gain access to the supply system.

With the above problems in mind, it is a general object of the present invention to provide a novel railcar roof that is constructed of a lightweight, resilient, and durable material that is easy to repair.

A second object is to provide a roof that has a dual-arc cross-sectional configuration with a plurality of spaced-apart, broad ribs.

Another object is to provide a roof with downwardly descending, arcuate ribs for use on a high cube railcar.

Still another object is to provide a roof that may be quickly and easily mounted on a railcar.

A further object is to provide a roof that avoids the heat-absorption and lighting problems inherent in steel roofs.

Yet another object is to provide a lightweight, unitary insulated roof for use on refrigerated and cryogenic railcars.

An additional object is to provide a unitary insulated roof and bunker assembly for use on a cryogenic railcar.

The fiberglass roof of a preferred embodiment of the invention features a composite fiberglass surface, which has a central portion and a peripheral region extending beyond the central portion. The central portion has a cross-sectional configuration that defines a first arc along the length of its cross-section. The roof also includes a plurality of spaced-apart, broad fiberglass ribs that are integrally formed in the central portion and extend both transverse to the longitudinal axis of the fiberglass surface as well as above the central portion. The ribs define a second arc that intersects the first arc. This unique, dual-arc structure, which includes broad elongate ribs, provides a fiberglass roof that is lightweight and simple, yet extremely durable and resilient. Preferably, the ribs form a unitary, seamless expanse with the fiberglass surface, and the entire roof is molded from a single sheet of composite fiberglass material.

In another embodiment of the invention, the fiberglass surface has a central portion with a lower face and a peripheral region extending beyond the central region. In this embodiment, a plurality of spaced-apart ribs are mounted on the lower face of the central portion and extend transverse to the longitudinal axis of the fiberglass surface. The ribs preferably have arcuate cross-sections, providing a fiberglass roof especially adapted for use on high cube railcars, whose height requires a roof that only extends above the railcar's sidewalls by a few inches.

Yet another embodiment of the invention is a fiberglass roof for use on cryogenic railcars. The roof includes a bunker that defines a recess for supporting cryogenic snow. A composite fiberglass surface is mounted on the bunker to enclose the recess, and an insulating layer is disposed between the bunker and the fiberglass surface. The roof further includes a manifold for delivering cryogenic material to the bunker. The manifold has a supply tube disposed below the lower surface of the bunker and a plurality of nozzles that extend from the supply tube through the bunker's lower surface and into the recess for forming cryogenic snow from the cryogenic material and for distributing the cryogenic snow within the recess.

These and other objects and advantages are obtained by the invention, which is described below in conjunction with the accompanying drawings.

BRIEF DESCRIPTION OF THE DRAWINGS

FIG. 3 is an enlarged cross-sectional view of the roof of FIG. 1 taken generally along the line 3—3 in FIG. 1 and showing the roof with a peripheral region that is mounted on a railcar.

FIG. 4 is an enlarged fragmentary side sectional view of the roof of FIG. 1 taken along the line 4—4 in FIG. 2 and showing the peripheral region of the roof mounted on a railcar.

FIG. 5 is an enlarged detail taken generally along the curved line 5 in FIG. 4, showing the peripheral region of the fiberglass surface mounted on the railcar with a structural adhesive.

FIG. 6 shows an alternate embodiment of the peripheral region shown in FIG. 5. As shown, the peripheral region includes a fiberglass portion that is integrally formed with the fiberglass surface and a clip that is coupled to the fiberglass portion and welded to the railcar.

FIG. 7 shows an alternate embodiment of the peripheral region shown in FIG. 5. As shown, the peripheral region includes a fiberglass portion that is integrally formed with the fiberglass surface and a weldable portion that is at least partially laminated within the fiberglass portion and is welded on the railcar.

FIG. 8 is a fragmentary top plan detail of the peripheral region of FIG. 7 with a region of the fiberglass portion removed to show details of internal construction.

FIG. 9 shows the roof of FIG. 1, as shown in FIG. 4 and including an insulating layer having a ceiling liner and volume of insulating material disposed between the liner and the fiberglass surface and ribs.

FIG. 10 shows an alternate embodiment of the insulating layer shown in FIG. 9.

FIG. 13 is an enlarged cross-sectional view of the roof of FIG. 11 taken generally along the line 13—13 in FIG. 11.

FIG. 14 is an enlarged fragmentary side sectional view of the roof of FIG. 11 taken generally along line 14—14 in FIG. 12.

FIG. 15 is an enlarged cross-sectional detail taken along the curved line 15 in FIG. 14 and showing the details of internal construction of the ribs and fiberglass surface.

FIG. 16 is an enlarged detail taken along the line 16—16 in FIG. 12 and showing a lap joint that connects two halves of the roof of FIG. 11.

FIG. 17 shows the roof of FIG. 11, as shown in FIG. 14 and including an insulating layer having a ceiling liner and a volume of insulating material disposed between the liner and the fiberglass surface and ribs.

FIG. 18 shows an alternate embodiment of the insulating layer of FIG. 17.

FIG. 20 is a fragmentary top plan view of the roof of FIG. 14.

FIG. 21 is a side sectional view of the roof of FIG. 19 taken along line 21—21 in FIG. 20.

DETAILED DESCRIPTION OF THE PREFERRED EMBODIMENT

Figure 1:
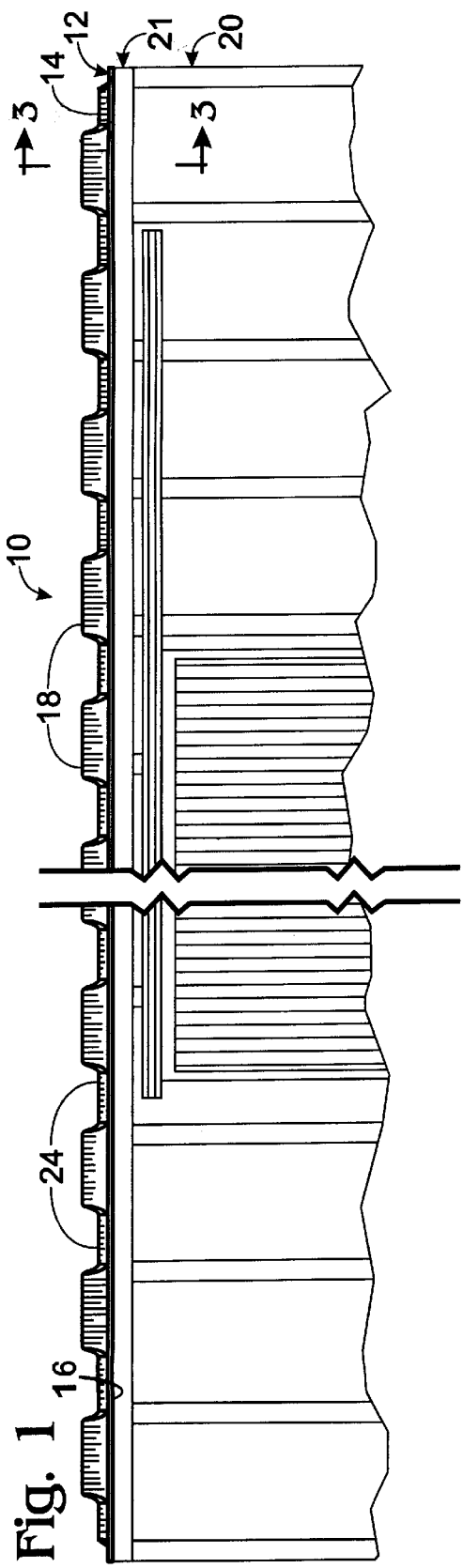
FIG. 1 shows a side view of the railcar roof mounted on a standard railcar. The roof includes a fiberglass surface and plural elongate fiberglass ribs that extend above the fiberglass surface.
Figure 2:
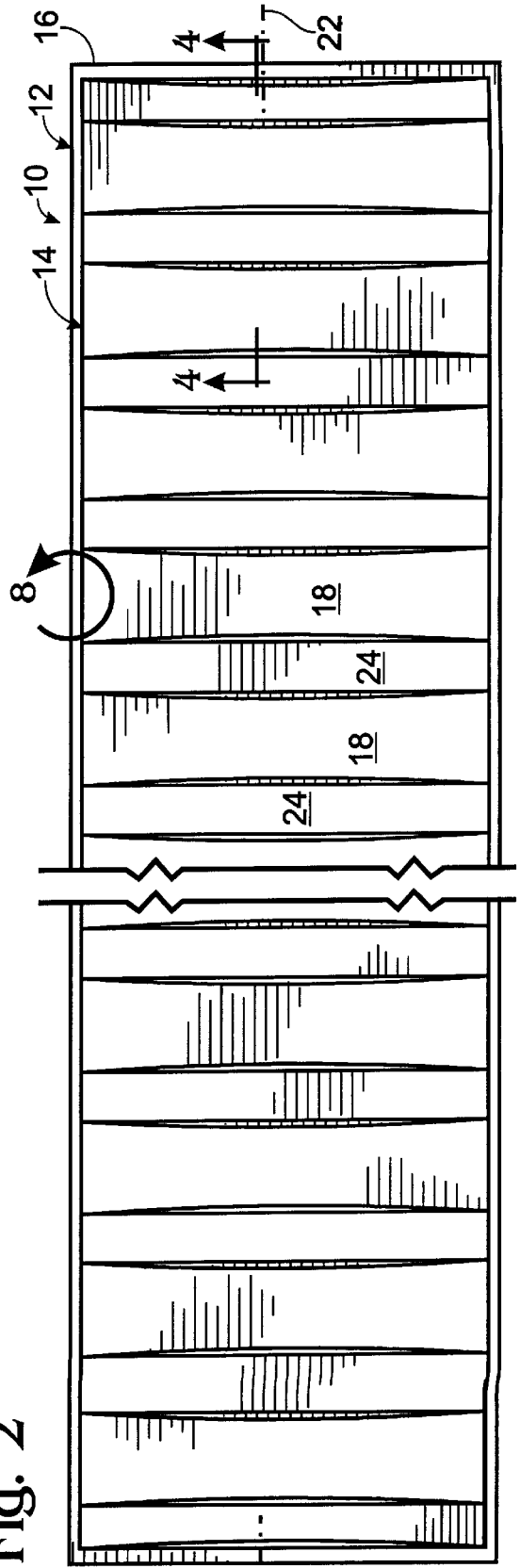
FIG. 2 is a top plan view of the roof of FIG. 1.

A fiberglass railcar roof constructed according to the present invention is shown in FIGS. 1 and 2, and is generally indicated at 10. As shown, roof 10 is mounted on the upper surface of a standard railcar, which is generally indicated at 20 and includes opposed sidewalls and end walls and a door. The sidewalls and end walls have upper edges that are collectively referred to as the railcar's upper surface. This upper surface is indicated generally at 21 in FIG. 1. Details of railcar 20 and upper surface 21 will differ depending upon the particular manufacturer and intended use of the railcar, and form no part of the invention.

Roof 10 includes a fiberglass surface 12 that covers and extends across the entire upper surface of railcar 20. Fiberglass surface 12 has a generally rectangular central portion 14 and a peripheral region 16 that extends beyond the central portion. Specifically, peripheral region 16 has a generally planar configuration and extends outward from the entire perimeter of central portion 14 to engage the railcar's upper surface 21. When used on a standard railcar, central portion 14 is approximately 9 feet wide and over 50 feet long. Peripheral region 16 extends beyond the central portion's entire perimeter by approximately 3 inches.

Roof 10 further includes a plurality of spaced-apart, broad fiberglass ribs 18. The ribs are elongate and extend transverse to the longitudinal axis of the fiberglass surface, which is generally indicated at 22 in FIG. 2. The ribs further extend above central portion 14. Preferably, ribs 18 are integrally formed, or molded, in central portion 14, thereby producing a roof having a unitary, seamless expanse. As shown in FIGS. 1 and 2, ribs 18 are spaced along the entire central portion of fiberglass surface 12 and define intermediate regions 24 of central portion 14 between adjacent ribs. Ribs 18 have inclined sidewalls 23 and flat tops 25.

As mentioned above, the ribs have relatively broad widths. As shown in FIGS. 2 and 3, each rib 18 spans central portion 14 and has a width, measured parallel to the longitudinal axis 22 of the fiberglass surface, that is approximately 22% of rib's length. Furthermore, each intermediate region 24 has a width that is approximately 54% of the width of each rib. Preferably, ribs 18 are approximately 9 feet long and two feet wide, and define intermediate regions that are approximately 9 feet wide and 16½ inches wide. It should be understood, however, that other configurations are possible and are within the scope of the invention. Each rib should have a width that is at least 10% of the rib's length. Additionally, the width of each intermediate region is preferably less than 75% of the width of each rib. This configuration of broad, elongate ribs provides an configuration that can be molded in a single, completely fiberglass unit.

A cross-sectional view of roof 10 is illustrated in FIG. 3. As shown, central portion 14 has a generally arched or bowed cross-sectional configuration that extends above the peripheral region to define a first arc, which is indicated at 26 and preferably extends along the entire width of the central portion. Ribs 18 each extend above the central portion and define a second arc, which intersects the first arc and is generally indicated at 28. Preferably, each rib 18 defines a second arc along the entire length of the rib. In the preferred embodiment shown in FIG. 3, the first and second arcs have radii of approximately 122 feet, 1 inch and 24 feet, 7 inches, respectively. It should be understood that the degree of curvature on the arcs shown in FIG. 3 have been exaggerated for purposes of illustration. The arcs intersect proximate the points where peripheral region 16 joins the central portion. This dual-arc configuration provides a roof that is capable of supporting significant loads. Specifically, roof 10 is capable of supporting a 15 lb/ft$^2$ snow load and a 300 lb point load anywhere across its surface. Furthermore, roof 10 will only deflect downward a maximum of one inch, as mandated in the standards established by the American Association of Railroads.

Preferably, roof 10 includes at least one layer of woven roving fiberglass, forming a generally planar framework of strands extending generally perpendicular to each other. This provides additional strength to the roof in both longitudinal and transverse directions. Even more preferably, the woven roving layer is laminated between additional layers of fiberglass material. One convenient and relatively inexpensive way to provide this construction is to begin with a layer of "Combomat," which is manufactured by Johnston Materials, Inc. and which contains a layer of woven roving fiberglass material stitched to a layer of chop strand, or randomly oriented, fiberglass material. A second layer of chop strand fiberglass material is then laminated to the exposed woven roving side.

Besides providing significant strength and resilience to the previously described roof, the composite fiberglass construction of the roof also significantly reduces the roof's weight when compared to conventional steel roofs. Specifically, the composite fiberglass roof shown in FIGS. 1–4 weighs approximately 60% to 70% less than a comparable steel roof. In addition, the upper face of roof 10 is preferably covered with a translucent UV-resistant coating, which not only allows external light to pass through the roof to illuminate the interior of an attached railcar, but also reflects heat away from the roof.

A further advantage of the roof's composite fiberglass construction, and especially the roof' woven roving fiberglass construction, is that the roof is extremely resistant to puncturing or tearing. Unlike steel roofs that are prone to tearing or permanent deformation, the unique configuration and woven construction of roof 10 provides a resilient surface capable of deflecting upwards at least 4 or 5 inches without tearing or causing the sides of the railcar to collapse inward. When the impact force that deformed the roof is removed, roof 10 resiliently returns to its prior, unstressed configuration. If the applied force is strong enough and localized enough to pierce the roof, its woven fiberglass construction constrains the tear to a minimal area. Furthermore, unlike galvanized steel roofs, roof 10 may be readily patched with another piece of fiberglass, even while the attached railcar is still in service.

The preferred method of mounting the peripheral region 16 of the roof on the upper surface 21 of the railcar is to use a structural adhesive, such as Lord Adhesives' Lord No. 410/#19 acrylic adhesive or a suitable equivalent. As shown in FIG. 5, a layer of adhesive, which is generally indicated at 30 and is enlarged for purposes of illustration, is disposed between the railcar's upper surface 21 and the peripheral region 16 of roof 10. This adhesive bond between roof 10 and the railcar's upper surface 21 has proven to be extremely strong and reliable. Furthermore, by using a structural adhesive to mount the roof on the railcar, the entire installation procedure can be completed in a just 3 or 4 man-hours, a fraction of the time it would take to install an equivalent steel roof. Another advantage of this method of attachment is that it does not require any additional holes to be drilled into the roof or the railcar. This is preferable because any hole or aperture in the railcar increases the possibility that water or other material can enter the railcar and contaminate the railcar's cargo.

Alternate embodiments of peripheral region 16 are shown in FIGS. 6 and 7 and are indicated generally at 16a and 16b, respectively. In these embodiments, the peripheral region includes a fiberglass portion 34, which is preferably integrally formed with fiberglass surface 12, and a metallic, or weldable, portion 36 that is coupled to and extends beyond the fiberglass portion. In FIG. 6, weldable portion 36 includes a clip 38, which is preferably constructed of galvanized steel. As shown, clip 38 has a first portion 40 that is welded to the railcar's upper surface 21. Clip 38 also has a second portion 42 that jackets at least a portion of fiberglass portion 34 and is coupled to this fiberglass portion by a structural adhesive 30, such as the previously described adhesive from Lord Adhesives.

In FIG. 7, another embodiment of weldable portion 36 is shown, as is generally indicated at 36a. In this embodiment, weldable portion 36a has a generally planar configuration and is constructed of galvanized steel. Weldable portion 36a has a first portion 40a, which is welded to upper surface 21, and a second portion 42a that is at least partially laminated within fiberglass portion 34. As shown in FIGS. 7 and 8, second portion 42a includes a plurality of spaced through-holes 44 along its length. Fiberglass portion 34 includes an upper layer 34a and a lower layer 34b, which collectively define a slot 45 for receiving portion 36a. During the forming process for fiberglass portion 34, the second portion of weldable portion 36a is inserted between layers 34a and 34b, where it is subsequently laminated and sealed between these layers. As shown, layers 34a and 36b each at least partially extrudes into through-hole 44. Once fully cured, the weldable portion is firmly and permanently united with roof 10.

It should be understood that weldable portions 36 and 36a could be attached to the railcar by methods other than welding. For example, the previously described structural adhesive could be used to bond these pieces together. Additionally, other suitable forums of mechanical attachment, such as rivets or bolts, could be used. Gluing is preferred, however, because it does not introduce additional holes into the roof or railcar and also does not require an additional sealing step.

When roof 10 is to be used on a refrigerated railcar, it is preferable for the roof to include an insulating layer. As shown in FIG. 9, insulating layer 46 is positioned beneath the bottom surface formed by ribs 18 and fiberglass surface 12 and is specifically configured to mate with this bottom surface. The layer includes a ceiling liner 48 which is coupled to the peripheral region of roof 10. The ceiling liner is substantially coextensive with roof 10 and is preferably formed of a fiberglass material. Ceiling layer 48 and the lower surfaces of ribs 18 and central portion 14 define a cavity 50 that is filled with an insulating material 52. Preferably, insulating material is formed of a closed-cell foam, which resists moisture absorption.

An alternate embodiment of insulating layer 46 is shown in FIG. 10 and generally indicated at 46a. In this embodiment, ceiling liner 48a extends below upper surface 21 and into the railcar's storage area. As shown, this results in a thicker insulating layer 46a. Similar to the first embodiment, insulating material 52a completely fills the cavity 50a defined between ceiling liner 48a and the lower surfaces of ribs 18 and central portion 14.

The previously described fiberglass roof, with its dual-arc cross-sectional configuration and broad elongate ribs, offers all of the features and advantages discussed above, and throughout this description, while avoiding essentially all manners of drawbacks that characterized conventional steel railcar roofs. Roof 10 is well suited to be used on all standard and intermediate height railcars, and its molded fiberglass construction makes the roof readily adaptable to specific railcar configurations. Nonetheless, when a fiberglass roof is to be used on a high cube railcar, it is often necessary to use an alternate embodiment of the invention because a roof that extends more than a few inches above the railcar would result in the railcar being unable to pass through many existing tunnels. Therefore, an alternate embodiment of roof 10 is needed for use on these high cube railcars.

Figure 11:
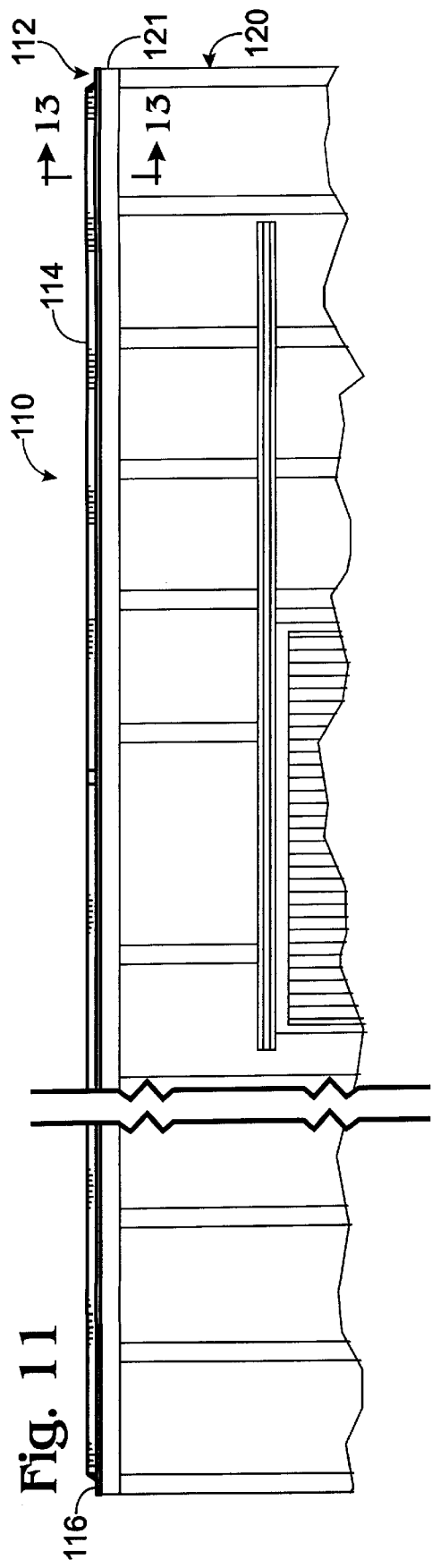
FIG. 11 is a side environmental view of an alternate embodiment of the railcar roof, showing the roof mounted on a high cube railcar. The roof includes a fiberglass surface and plural broad fiberglass ribs that extend below the fiberglass surface.

Indicated at 110 in Fig. 11 is a fiberglass roof constructed in accordance with the present invention, and particularly suited for use on a high cube railcar. The upper portion of a high cube railcar is indicated at 120 and has an upper surface 121 on which roof 110 is mounted. It should be understood that railcar 120 forms no part of the invention.

Figure 12:
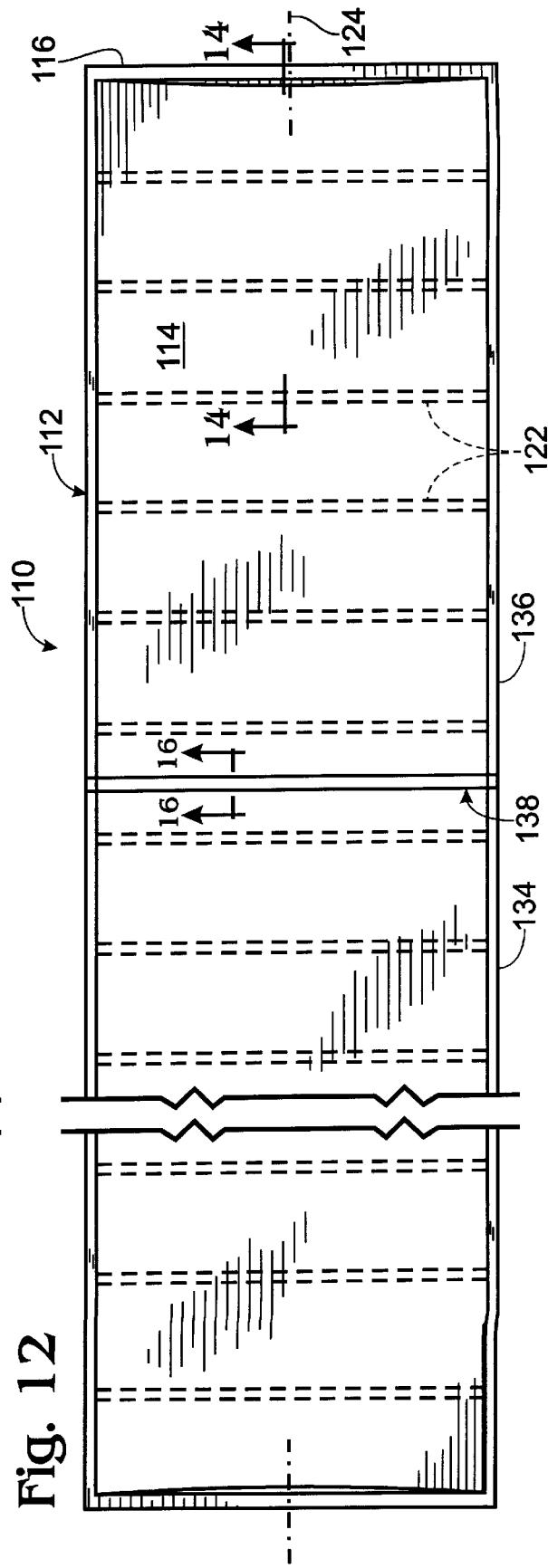
FIG. 12 is a top plan view of the roof of FIG. 11.

As shown in Figs. 11–12, roof 110 includes a composite fiberglass surface 112 with a central portion 114 that extends above a peripheral region 116 and has a lower face 118. The central portion preferably has a cross-section that defines an arc along its length, as shown in FIG. 13. Peripheral region 116 extends beyond central portion 114 and preferably has a generally planar configuration that extends outward from the entire perimeter of central portion 114. As shown, fiberglass surface 112 is very similar in size and materials of construction as the previously described fiberglass surface of roof 10, except surface 112 is usually longer than fiberglass surface 12 because high cube railcars are typically approximately 17 feet longer than standard railcars. The fiberglass surface is constructed of the same composite fiberglass material as surface 12 and may be formed in one large, unitary expanse. It should be understood that roof 110 is specifically designed for use on high cube railcars, but it may also be used on standard or intermediate sized railcars.

As discussed, roof 110 contains a peripheral region 116 that extends beyond the roof's central portion 114. Preferably, peripheral region 116 is integrally formed with the central portion of the roof and is mounted on the upper surface of railcar 120 using a structural adhesive, as shown at 123 in FIG. 14. This method of mounting the roof on a railcar was described in detail with respect to roof 10 and is equally applicable to roof 110. Additionally, the alternate embodiments of the peripheral region described with respect to roof 10 are also equally applicable to roof 110.

Roof 110 further includes plural elongate ribs 122 that are mounted on the lower face of central portion 114 and extend transverse to the longitudinal axis of the fiberglass surface, which is indicated generally at 124 in FIG. 20. Preferably, ribs 122 extend downward from lower face 118 no further than peripheral region 116 and have arcuate cross-sections, as shown in FIG. 14. On a conventional high cube railcar with a length of approximately 68 feet and a width of approximately 9½ feet, ribs 122 are preferably 9 feet long, approximately 5 inches wide and spaced approximately 4 feet apart from each other. Furthermore, ribs 122 are preferably formed of a composite fiberglass material, such as the woven roving fiberglass construction discussed previously.

This unique configuration provides a durable and resilient roof that is capable of withstanding extreme forces and loads. Roof 110 preferably extends above the upper surface of railcar 120 no further than 3 inches. The unique arcuate composite fiberglass construction of ribs 122, in conjunction with the resilient nature of fiberglass surface 112, produces a roof that is resistant to ripping or tearing. When the lower face of the roof is struck by the mast of a forklift or by cargo being loaded into and removed from the railcar, the roof 110 will temporarily deform upward until the force is gone. After this, the resilient nature of roof 110 returns the roof to its original position. Additionally, the resilient, arcuate configuration of ribs 122 causes the mast or cargo that impact the ribs to glance off the ribs rather than firmly engaging the ribs and possibly tearing or otherwise deforming the roof.

Ribs 122 may be integrally formed on the lower face 118 of the roof's central portion 114. The preferred method of manufacturing roof 110, however, is to begin with independent, pre-formed ribs are formed of a composite fiberglass material such as the material described previously with respect to roof 10. Next, fiberglass surface 112 is molded from a similar composite fiberglass material. Before the fiberglass surface completely cures, the pre-formed ribs are positioned in a spaced relationship on the lower face of the fiberglass surface. Because the fiberglass surface is still tacky, the ribs and fiberglass surface adhere to each other and are firmly united once the fiberglass surface completely cures. After bonding the ribs to the fiberglass surface, it is preferred that an additional layer of fiberglass material is placed over at least the regions at which the ribs and fiberglass surface are in contact with each other. This configuration is illustrated in FIG. 15, where fiberglass layer 126 overlays and protects ribs 122 and lower face 118. Other methods of attaching ribs 122 to fiberglass surface 112 are possible and are within the scope of the invention. For example, the ribs could be attached to fiberglass surface 122 using a structural adhesive, such as the previously described adhesive manufactured by Lord Adhesives.

While the fiberglass surface has been described as being formed in one broad unitary expanse, it is often desirable to form this surface in two or more sections that are joined by a lap joint or other suitable form of interconnection. A lap joint is preferred, however, because it does not introduce additional holes to the roof structure. By referring briefly back to FIGS. 11 and 12, one can see that roof 110 includes a first section 134 and a second section 136, which are joined by lap joint 138. Lap joint 138 is illustrated in greater detail FIG. 16. As shown, the first section 134 terminates and rests on portion 140 of the second section. Sections 134 and 136 are preferably overlap by approximately 6 inches and are joined by a structural adhesive, which is indicated at 142 in FIG. 16. It should be understood that the roof shown in FIGS. 1–10 could incorporate a similar sectional configuration. Nonetheless, the preferred form of roofs 10 and 110 is a single, unitary fiberglass surface. This construction provides the greatest possible strength to the roofs and results in the minimum number of seams or seals in the roofs.

When used on a refrigerated, high cube railcar, roof 110 includes an insulating layer similar to layer 46 described with respect to roof 10. As shown in FIG. 17, the insulating layer is indicated at 146 and includes a ceiling liner 148 disposed beneath ribs 122 and fiberglass surface 112. The liner is coupled to fiberglass surface 112 adjacent or at the surface's peripheral region 116 and defines a cavity into which insulating material is placed. Preferably, the insulating material is a foamed closed-cell material that is injected into cavity 150, where is subsequently hardens. As shown in FIG. 17, insulating material 152 completely fills cavity 150, which is bounded by ceiling liner 148 and the surface formed by ribs 122 and fiberglass surface 112. When a roof is desired that has greater insulating properties than the roof shown in FIG. 17, the ceiling liner should extend below the upper surface 121 of railcar 120 and into the railcar's storage area. As illustrated in FIG. 18, insulating layer 146a includes a ceiling liner 148a that extends into the storage area of railcar 120. This results in a cavity 150a with a much greater volume than the cavity shown in FIG. 17. Cavity 150a is preferably completely filled with insulating material 152a.

A further application of the previously described fiberglass roof is for use on a cryogenic railcar. Cryogenic railcars differ from refrigerated railcars in that they do not include a mechanical refrigeration system. Instead, these railcars have a false ceiling, which defines a bunker into which cryogenic material is stored. Typically, the bunker receives an initial charge of cryogenic material from an external source. This initial charge provides the necessary cooling of the railcar's contents and typically lasts for many days or even weeks.

In this embodiment of the invention, the roof includes either of the previously described roofs 10 and 110 with their respective insulating layers 46 and 146. For purposes of illustration, the roof is generally indicated at 210 in FIGS. 19–21 and includes the previously described roof 10. In addition, to increase the life of the charged cryogenic material, roof 210 is shown incorporating the previously described insulating layer 46a. It should be understood, however, that any of the previously described embodiments or their suitable equivalents could be used.

Figure 19:
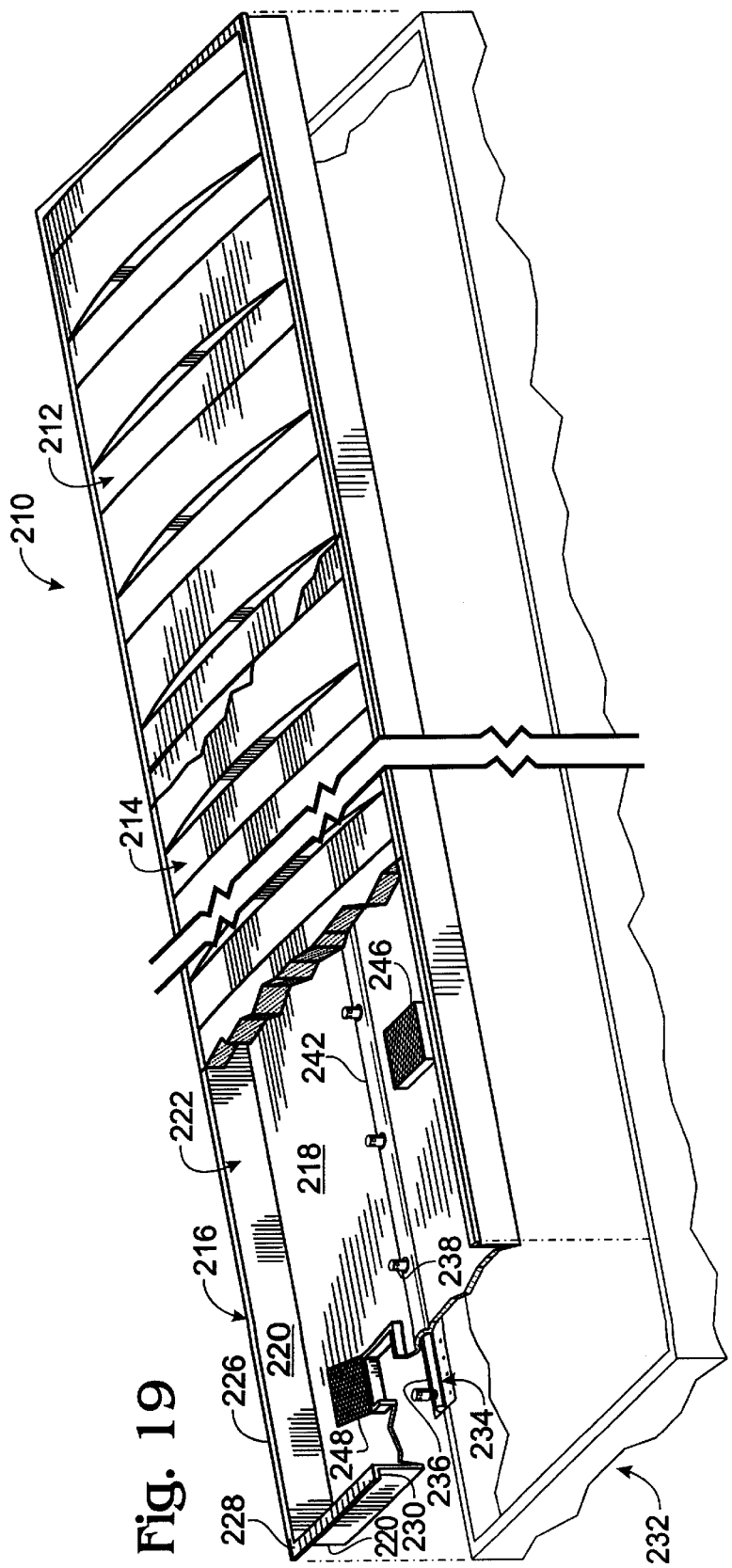
FIG. 19 is a fragmentary isometric view of an alternate embodiment of the railcar roof of FIG. 1 positioned above the upper surface of a railcar. As shown, the roof is configured for use on a cryogenic railcar and includes a fiberglass surface with elongate ribs, a bunker and an insulating layer disposed between the fiberglass surface and the bunker.

As shown in FIG. 19, roof 210 is positioned above the upper surface of a railcar, which is indicated generally at 232 as forms no part of the invention. As shown, the roof includes a composite fiberglass surface 212 and an insulating layer 214. As discussed, fiberglass surface 212 is shown as being the previously described roof 10, and insulating layer 214 is the previously described layer 46a. In this embodiment, the interconnection and construction of surface 212 and layer 214 are unchanged, and for brevity's sake, will not be repeated. Roof 210 further includes a bunker 216 for supporting cryogenic snow (not shown). Bunker 216 has a lower surface 218 and walls 220 that collectively define a recess 222 within the bunker. Preferably the bunker is generally comprised of a composite fiberglass material, such as the material described with respect to roof 10. In the preferred embodiment, the lower surface of bunker 216 includes a balsa layer laminated between layers of stitch mat and is arched or bowed upward by approximately 1 inch to have a generally arcuate cross-sectional configuration. This arched, laminated-balsa construction of the bunker's lower surface enables it to support large quantities of cryogenic snow. For example, a cryogenic railcar is typically charged with approximately 16,000 to 18,000 pounds of cryogenic snow. The degree of curvature of lower surface may vary depending on the amount of cryogenic snow the bunker is designed to support.

As shown in FIG. 19, the bunker's walls 220 extend upward from lower surface 218 and terminate with a flange-like peripheral region 226. Preferably, walls 220 are approximately 10 inches high. Peripheral region 226 has an upper surface 228, which is coupled to insulating layer 214 and fiberglass surface 212, and a lower surface 230 that is mounted on the upper surface of a railcar. Preferably peripheral region 226 is mounted on this upper surface 232 with a structural adhesive. It should be understood, however, that peripheral region 226 could encompass any of the embodiments described with respect to roofs 10 and 110. The railcar's upper surface often includes an inwardly extending shoulder 233 on which the bunker's lower surface 218 is seated and supported, as shown in FIG. 21.

Roof 210 also includes a manifold for delivering cryogenic material to bunker 216. As shown in FIGS. 19–21 and indicated generally at 234, the manifold includes a supply tube 236, which is disposed below the bunker's lower surface 218. Preferably, supply tube 236 extends generally parallel to the bunker's longitudinal axis, and nozzles 238 are spaced approximately 2½ to 3 feet-apart along the entire length of supply tube 236. Additionally, the lower surface of bunker 216 preferably defines a channel 242 that extends upwardly into recess 222 and into which supply tube 236 is received. A generally planar mounting plate 244 is coupled to the bottom face of lower surface 218 to enclose the supply tube within channel 242. Plate 244 not only supports the supply tube within channel 242, but it also protects the tube from being struck and/or damaged by cargo or other objects within the railcar. Furthermore, by receiving the supply tube into an upwardly extending channel, the bottom face of the bunker's lower surface retains a generally smooth, continuous configuration. This is preferable because it increases the storage capacity of the railcar and reduces the possibility of the supply tube being damaged while the railcar is in use.

Manifold 234 also includes a plurality of nozzles 238 that are connected to and extend upward from the supply tube through the lower surface of the bunker. Nozzles 238 further extend into recess 222 for forming cryogenic snow from cryogenic material and for distributing the cryogenic snow within the recess. It is preferred that the nozzles may be easily removed from and reattached to the supply tube to allow the nozzles to be cleaned, repaired or replaced, as needed. One suitable way to accomplish this is to use nozzles that have threaded lower portions, which are screwed into the supply tube. Additionally, each nozzle 238 often includes a fastening mechanism, such as a threaded washer or bolt, that is retained on the threaded portion of the nozzle and is used to draw the supply tube into film engagement with the lower surface of the bunker.

Also seen in FIGS. 19–21 are a plurality of spaced ports that extend through the bunker's lower surface 218. Ports 246 further extend upwardly into recess 222 and are each covered with a fine mesh or screen 248. Each screen 248 is pivotably mounted on its associated port to provide access to nozzles 238 and the inside of bunker 216 from the interior of the railcar. As shown, the ports are selectively spaced along the bunker's lower surface on alternating sides of channel 242. Preferably, ports 246 are selectively sized and spaced to enable a user to reach through a polt to access the nozzles. As shown, ports 246 have generally square configurations, with each side having a length of approximately 12 inches, thereby defining a port with a cross-sectional area of 144 square inches. Furthermore, the ports are spaced so that every nozzle is approximately 18 inches from at least one port. This selective sizing and spacing enables a user to access the nozzles without having to disassemble the roof.

To charge bunker 216 with cryogenic snow, supply tube 236 is connected to an external supply, which delivers cryogenic material under pressure to the supply tube. Preferably, at least one end of supply tube 236 extends through one of the railcar's walls, where it can be connected to an external supply of cryogenic material. The other end of supply tube 236 is sealed, as shown in FIG. 19. Generally, this cryogenic material is liquid carbon dioxide. For purposes of illustration, this charging process is described using carbon dioxide, although it should be understood that other cryogenic material may be used and is within the scope of the invention. The supplied liquid carbon dioxide is transported through supply tube 236 to nozzles 238, where it is expelled into recess 222. It should be understood that the pressure external nozzles 238 is significantly less than the pressure at which the cryogenic material is delivered. Therefore, once the liquid carbon dioxide is expelled from nozzles 238, it "flashes" and instantaneously forms cryogenic snow, namely, solid carbon dioxide (commonly known as dry ice) and carbon dioxide gas. The gaseous carbon dioxide immediately passes through ports 246 into the railcar, where it is vented out of the railcar. The solid carbon dioxide is retained within and fills bunker 216. Typically, between approximately 50% and 60% of the supplied liquid carbon dioxide is immediately converted to gaseous carbon dioxide and vented from the railcar. The remaining material, now solid carbon dioxide, is retained within the bunker and slowly sublimates (changes directly to gas) over a period of many days or even weeks. During this sublimation process, the solid and gaseous carbon dioxide maintains the railcar's storage area at a cryogenic temperature.

While the preferred embodiments of the invention have been described, it should be obvious that variations and modifications thereto are possible without departing from the spirit and scope of the invention.

It is claimed and desired to secure by letters patent:

1. A fiberglass roof for a railcar, comprising:
    a composite fiberglass surface having a central portion with a cross-sectional configuration that defines a first arc and a peripheral region that extends beyond the central portion; and
    plural elongate fiberglass ribs integrally formed in the central portion, extending transverse to the longitudinal axis of the fiberglass surface and further extending above the central portion to define a second arc that intersects the first arc.

2. The roof of claim 1, wherein the fiberglass surface and the ribs comprise a unitary, seamless expanse.

3. The roof of claim 1, wherein each of the ribs is continuously tapered, and further wherein the taper of each rib is measured from the longitudinal axis of the fiberglass surface in the direction of the peripheral region transverse to the longitudinal axis of the fiberglass surface.

4. The roof of claim 1, wherein the peripheral region includes a fiberglass portion integrally formed with the fiberglass surface and a clip coupled to and extending beyond the fiberglass portion.

5. The roof of claim 1, wherein the peripheral region includes a fiberglass portion integrally formed with the fiberglass surface and a weldable portion at least partially laminated within the fiberglass portion and extending beyond the fiberglass portion.

6. The roof of claim 5, wherein the weldable portion defines a plurality of through-holes through which the fiberglass portion extends.

7. The roof of claim 1, wherein the central portion and ribs define a common bottom surface, and wherein the roof further includes an insulating layer configured to mate with the bottom surface.

8. The roof of claim 7, wherein the insulating layer includes a liner, which is formed from a fiberglass material and which is substantially coextensive with and coupled to the fiberglass surface, and a volume of insulating material disposed between the liner and the fiberglass surface.

9. The roof of claim 1, wherein the fiberglass surface defines the first arc substantially along the length of its cross-section, and each rib defines the second arc substantially along the length of its cross-section, with each cross-section taken transverse to the longitudinal axis of the fiberglass surface.

10. A roof for a cryogenic railcar, comprising:
    a bunker for supporting cryogenic snow, wherein the bunker has a lower surface and opposed walls that define a recess within the bunker;
    a composite fiberglass surface mounted to the side walls to enclose the recess;
    an insulating layer disposed between the fiberglass surface and the bunker;
    a manifold for delivering cryogenic material to the bunker wherein the manifold includes a supply tube disposed below the lower surface of the bunker and a plurality of nozzles extending from the supply tube through the lower surface of the bunker and into the recess for forming cryogenic snow from cryogenic material and for distributing the cryogenic snow within the recess; and a plurality of spaced ports that extend through the lower surface of the bunker.

11. The roof of claim 10, wherein the lower surface includes a channel into which the supply tube is received.

12. The roof of claim 11, wherein the ports are proximate the channel in the lower surface of the bunker and are each sized to have cross-sectional areas of at least 100 square inches.

13. The roof of claim 10, wherein the supply tube extends generally parallel to the longitudinal axis of the bunker.

14. The roof of claim 10, wherein the ports include a screen pivotally mounted on the ports to prevent cryogenic snow from passing through the port.

15. The roof of claim 10, wherein the fiberglass surface, insulating layer, and bunker are mounted together with a structural adhesive to form a unitary structure.

16. The roof of claim 10, wherein the cryogenic material is carbon dioxide.

17. The roof of claim 10, wherein the walls and least a portion of the lower surface of the bunker are constructed of a composite fiberglass material.

18. A railcar, comprising:

a body; and a roof mounted on the body, wherein the roof includes:
    a composite fiberglass surface having a central portion with a cross-sectional configuration that defines a first arc and a peripheral region that extends beyond the central portion; and
    plural elongate fiberglass ribs integrally formed in the central portion, extending transverse to the longitudinal axis of the fiberglass surface and further extending above the central portion to define a second arc that intersects the first arc.

19. The railcar of claim 18, wherein the roof is adhesively mounted on the body.

20. A cryogenic railcar, comprising:

a body; and a roof mounted on the body, wherein the roof includes:
    a bunker for supporting cryogenic snow, wherein the bunker has a lower surface and opposed walls that define a recess within the bunker;
    a composite fiberglass surface mounted to the side walls to enclose the recess;
    an insulating layer disposed between the fiberglass surface and the bunker;
    a manifold for delivering cryogenic material to the bunker wherein the manifold includes a supply tube disposed below the lower surface of the bunker and a plurality of nozzles extending from the supply tube through the lower surface of the bunker and into the recess for forming cryogenic snow from cryogenic material and for distributing the cryogenic snow within the recess; and
    a plurality of spaced ports that extend through the lower surface of the bunker.

21. The railcar of claim 20, wherein the roof is adhesively mounted on the body.

* * * * *